(12) United States Patent
Carey et al.

(10) Patent No.: US 10,387,684 B2
(45) Date of Patent: Aug. 20, 2019

(54) INTERLOCKED BLOCKCHAINS TO INCREASE BLOCKCHAIN SECURITY

(71) Applicant: International Business Machines Corporation, Armonk, NY (US)

(72) Inventors: James E. Carey, Rochester, MN (US); Scott N. Gerard, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 15/374,493

(22) Filed: Dec. 9, 2016

(65) Prior Publication Data

US 2018/0165476 A1 Jun. 14, 2018

(51) Int. Cl.
*H04L 9/32* (2006.01)
*G06F 21/57* (2013.01)
*G06F 21/64* (2013.01)

(52) U.S. Cl.
CPC ............ *G06F 21/64* (2013.01); *G06F 21/577* (2013.01); *H04L 9/3236* (2013.01); *H04L 9/3247* (2013.01); *H04L 9/3297* (2013.01); *H04L 2209/38* (2013.01); *H04L 2209/56* (2013.01)

(58) Field of Classification Search
CPC ..... G06F 21/64; G06F 21/577; H04L 9/3297; H04L 9/3236; H04L 9/3247; H04L 2209/56; H04L 2209/38
USPC .......................................................... 726/25
See application file for complete search history.

(56) References Cited

U.S. PATENT DOCUMENTS

| 2015/0262137 | A1 | 9/2015 | Armstrong |
| 2015/0287026 | A1 | 10/2015 | Yang et al. |
| 2016/0028552 | A1 | 1/2016 | Spanos et al. |
| 2016/0086175 | A1 | 3/2016 | Finlow-Bates et al. |
| 2016/0098723 | A1 | 4/2016 | Feeney |
| 2017/0149819 | A1* | 5/2017 | Androulaki ........... H04L 9/3236 |
| 2018/0225611 | A1* | 8/2018 | Daniel ................. G06Q 20/065 |

FOREIGN PATENT DOCUMENTS

WO WO2015077378 A1 5/2015

OTHER PUBLICATIONS

Watanabe H., et al., "Blockchain Contract: Securing a Blockchain Applied to Smart Contracts"; 2016 IEEE International Conference on Consumer Electronics; pp. 467-468.

* cited by examiner

*Primary Examiner* — William S Powers
*Assistant Examiner* — Aubrey H Wyszynski
(74) *Attorney, Agent, or Firm* — Scully, Scott, Murphy & Presser, P.C.; Joseph Petrokaitis, Esq.

(57) ABSTRACT

Systems and methods for preventing vulnerabilities in a blockchain due to quiescence are disclosed including submitting a first crosslink transaction for addition to a first blockchain that includes cross-referencing information for a second crosslink transaction that corresponds to the first crosslink transaction and submitting the second crosslink transaction for addition to a second blockchain that includes cross-referencing information corresponding to the first crosslink transaction. The first and second crosslink transactions are configured to be usable together by a user of at least one of the first and second blockchains to validate at least a portion of one of the first and second blockchains after a period of quiescence in the one of the first and second blockchains.

20 Claims, 7 Drawing Sheets

| TIME PERIOD | BLOCKCHAIN A | BLOCKCHAIN B |
| --- | --- | --- |
| t0 | APPEND CROSSLINK TRANSACTION | APPEND CROSSLINK TRANSACTION |
| t0-t1 | REGULAR TRANSACTION INFLOW | REGULAR TRANSACTION INFLOW |
| t1 | APPEND CROSSLINK TRANSACTION | APPEND CROSSLINK TRANSACTION |
| t1-t2 | NO TRANSACTION INFLOW | REGULAR TRANSACTION INFLOW |
| t2 | APPEND CROSSLINK TRANSACTION | APPEND CROSSLINK TRANSACTION |
| t2-t3 | REGULAR TRANSACTION INFLOW | REGULAR TRANSACTION INFLOW |

INTERLOCKED BLOCKCHAINS TO INCREASE BLOCKCHAIN SECURITY

BACKGROUND

Blockchain technology was developed as a way of providing a publicly transparent and decentralized ledger that is configured to track and store digital transactions in a publicly verifiable, secure, and hardened manner to prevent tampering or revision.

A typical blockchain includes three primary functions: read, write, and validate. For example, a user of the blockchain must have the ability to read the data that resides on the blockchain. A user of the blockchain must also have the ability to write, e.g. append, data to the blockchain. Every write operation starts out as a proposed transaction that is posted on the network. The transaction may be submitted for addition to the blockchain by a user of the blockchain, for example, a wallet application or other application program interface (API). Once submitted, the proposed transaction is added to a pool of available transactions for addition to the blockchain. Validator nodes associated with the blockchain may then select transactions from the pool for addition to a new block.

In some cases, the transaction found in the pool may not always be valid, for example, they may be malformed (syntax errors), or may constitute an attempt to perform a task for which the submitter is not authorized. Validation refers to filtering out invalid transactions and then deciding on the exact order for the remaining, valid, transactions selected for addition to the blockchain as part of a new block. Validation is often performed by validator nodes associated with the blockchain.

Once ordered, the transactions are packaged into a new block, and the new block is voted on by the validator nodes associated with the blockchain to determine whether to add the new block to the blockchain. If a consensus to add the new block is reached, e.g., a threshold number of "for" votes, the new block may be appended to the blockchain. Each new block that is appended to the blockchain also includes a hash of the previous block. Accordingly, as each new block is added, the security and integrity of the entire blockchain is further enhanced. It is important to note that once data is written to the blockchain, for example, once a block including a set of transactions has been appended to the blockchain, that data can no longer be altered or modified. In a typical blockchain, the anonymity of the users is protected through the use of pseudonyms and the transaction data itself is protected through the use of cryptography, e.g., via the use of hash codes.

BRIEF SUMMARY

The system, method, and computer program product described herein prevent vulnerabilities in a blockchain due to a period of quiescence.

In an aspect of the present disclosure, a method for preventing vulnerabilities in a blockchain due to a period of quiescence is disclosed. The method includes submitting, by a computing device associated with a party, a first crosslink transaction for addition to a first blockchain. The first crosslink transaction includes cross-referencing information for a second crosslink transaction that corresponds to the first crosslink transaction. The method further includes submitting, by the computing device associated with the party, the second crosslink transaction for addition to a second blockchain. The second crosslink transaction includes cross-referencing information corresponding to the first crosslink transaction. The first and second crosslink transactions are configured to be usable together by a user of at least one of the first and second blockchains to validate at least a portion of one of the first and second blockchains after a period of quiescence in the one of the first and second blockchains.

In some aspects, the first and second crosslink transactions each include an identifier to the first blockchain, an identifier to the second blockchain, a message digest of a last block of the first blockchain previous to a block containing the first crosslink transaction, a message digest of a last block of the second blockchain previous to a block containing the second crosslink transaction, and a transaction digest of the respective crosslink transaction. In some aspects, the transaction digest is digitally signed by a private key of the party.

In an aspect, the method further includes querying the first blockchain for the first crosslink transaction, identifying the second blockchain based on the first crosslink transaction, querying the second blockchain for the corresponding second crosslink transaction based on the identification of the second blockchain based on the first crosslink transaction, verifying that the second crosslink transaction corresponds to the first crosslink transaction, and validating the second blockchain based on the verification that the second crosslink transaction corresponds to the first crosslink transaction.

In another aspect, the method further includes querying the first blockchain for the first crosslink transaction, identifying the second blockchain based on the first crosslink transaction, querying the second blockchain for the corresponding second crosslink transaction based on the identification of the second blockchain based on the first crosslink transaction, determining based on a result of the query that the second crosslink transaction is not present in the second blockchain, and invalidating at least a portion of the second blockchain based on the determination that the second crosslink transaction corresponding to the first crosslink transaction is not present in the second blockchain.

In yet another aspect, the method further includes querying the first blockchain for the first crosslink transaction, identifying the second blockchain based on the first crosslink transaction, querying the second blockchain for the corresponding second crosslink transaction based on the identification of the second blockchain based on the first crosslink transaction, determining based on a result of the query that the second crosslink transaction is present in the second blockchain, comparing the second crosslink transaction to the first crosslink transaction, based on the comparison, determining that the second crosslink transaction does not correspond to the first crosslink transaction, the lack of correspondence between the first and second crosslink transactions indicating that the second crosslink transaction has been modified, and invalidating at least a portion of the second blockchain based on the determination that the second crosslink transaction does not correspond to the first crosslink transaction.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

The present disclosure provides methods and systems for preventing vulnerabilities in a blockchain due to a period of quiescence.

Figure 1:
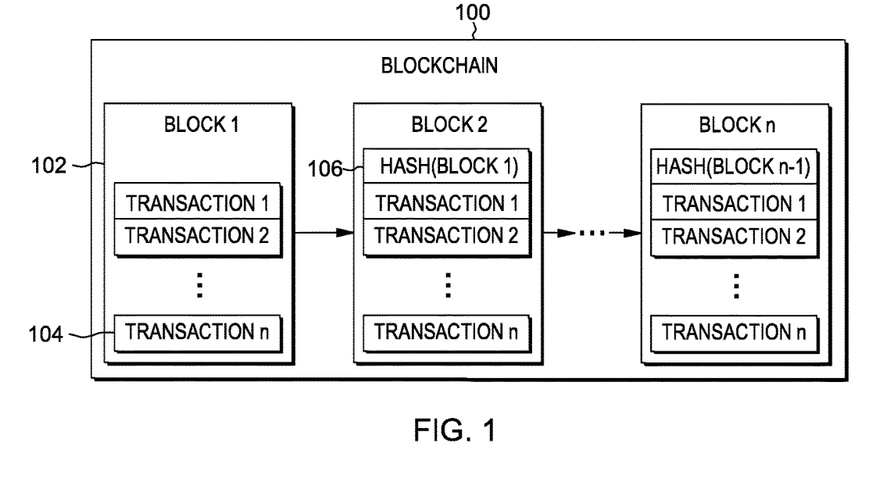
FIG. 1 is a diagram illustrating a blockchain in accordance with an aspect of the present disclosure.

With reference now to FIG. 1, a blockchain 100 includes a plurality of data blocks 102. Each data block 102 is a data structure that includes data representing transactions 104, for example, prescriptions, queries to the blockchain regarding a prescription, or any other transaction related to a prescription. As described above, as new transactions 104 are submitted to the blockchain 100 and validated by validator nodes, additional data blocks 102 are generated by the validator nodes and appended to the blockchain 100. Each new data block 102 includes a set of validated transactions 104 and a hash 106 of the content of the immediately previous data block 102. For example, data block "2" includes a hash of the content of block "1", block "n" includes a hash of the content of block "n−1", etc. Some non-limiting examples of blockchains include Bitcoin®, Ethereum®, OpenLedger™, or other similar blockchains.

Figure 2:
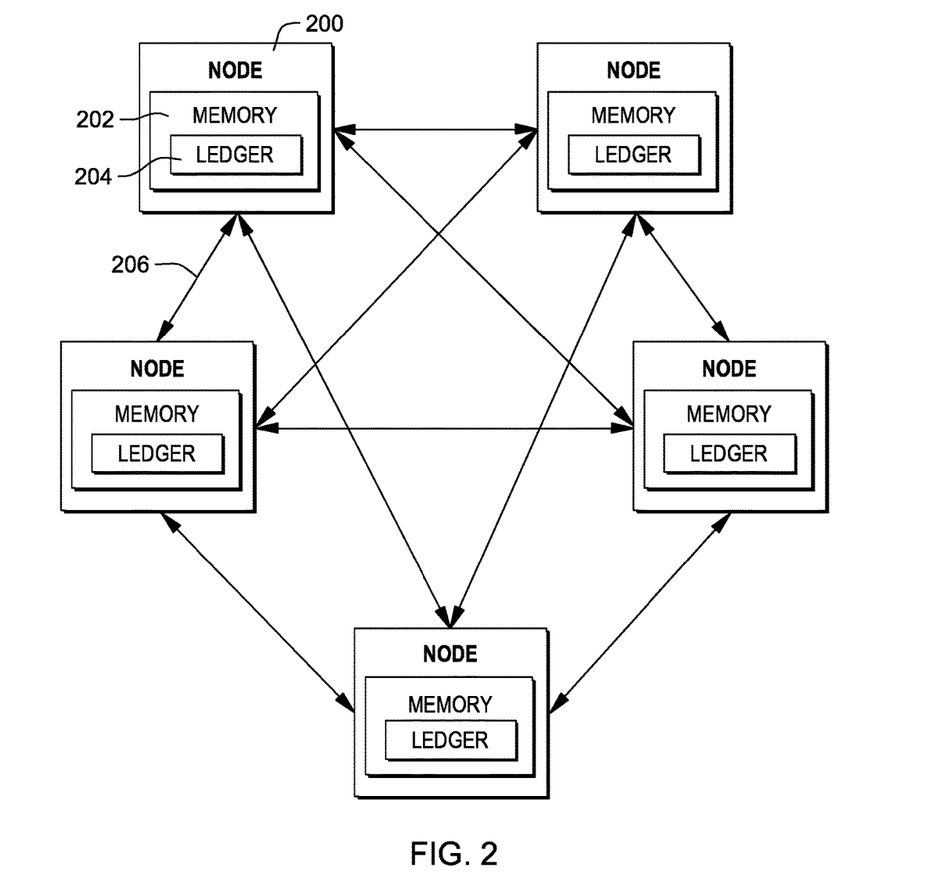
FIG. 2 is a system diagram illustrating nodes associated with the blockchain of FIG. 1 and storing the ledger of the blockchain of FIG. 1 in accordance with an aspect of the present disclosure.

With reference now to FIG. 2, in some aspects, blockchain 100 is stored in a decentralized manner on a plurality of nodes 200, e.g., computing devices located in one or more networks. Nodes 200 may each include a memory 202 that stores at least a portion of a ledger 204 of blockchain 100. Ledger 204 includes any data blocks 102 that have been validated and added to the blockchain 100. In some aspects, every node 200 may store the entire ledger 204. In some aspects, each node 200 may store a portion of ledger 204. In some aspects, some or all of blockchain 100 may be stored in a centralized manner. Nodes 200 may communicate with one another via communication pathways 206, e.g., wired or wireless connections, over the internet, etc. to transmit and receive data related to ledger 204. For example, as new data blocks 102 are added to ledger 204, nodes 200 may communicate or share the new data blocks 102 via communication pathways 206.

Figure 3:
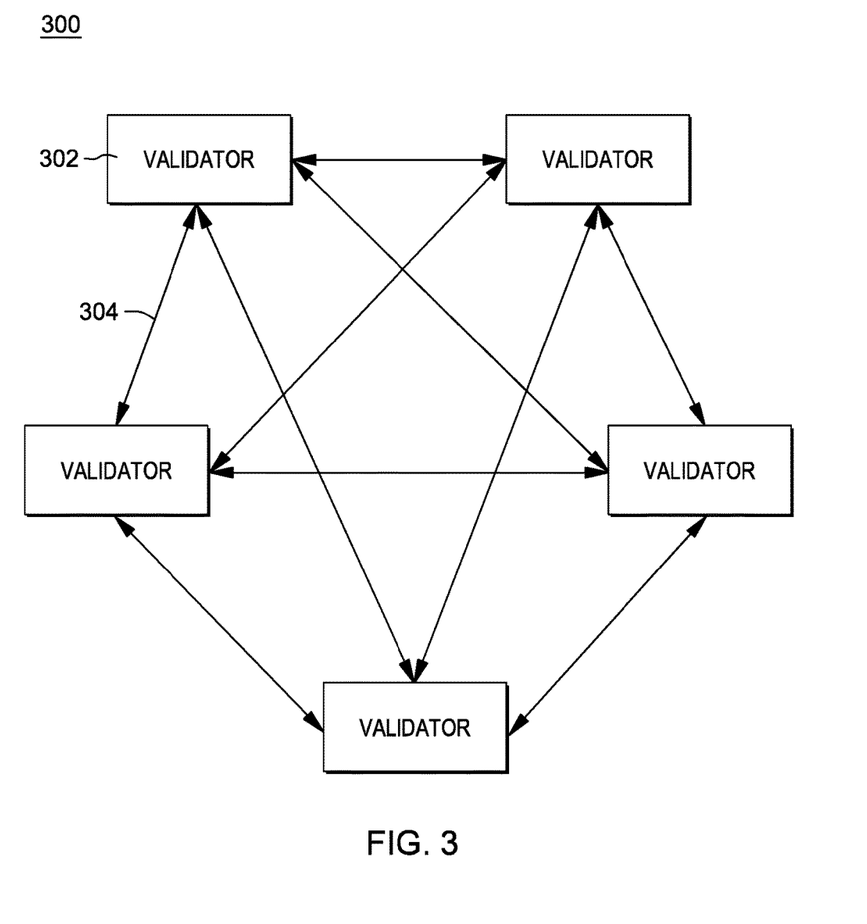
FIG. 3 is a system diagram illustrating validator nodes associated with the blockchain of FIG. 1 in accordance with an aspect of the present disclosure.

With reference now to FIG. 3, any transactions 104 submitted to blockchain 100 are validated by a set of validator nodes 300 associated with blockchain 100. For example, transactions 104 may be transmitted to one or more of the validator nodes 300 and may be shared between the validator nodes 300 for validation and consensus. Each validator node 302 determines whether a transaction 104 is valid and whether the transaction 104 complies with the rules of the blockchain 100. The validator node 302 adds a plurality of the validated transactions 104 to a data block 102 and submits the data block 102 for consensus by all or some of the other validator nodes. The other validator nodes 302 then vote "for" or "against" appending the data block 102 containing the transactions 104 to the blockchain 100. A consensus of the set of validator nodes 300, e.g., a threshold number of identical votes "for" or "against", is required to allow or deny the data block 102 to be appended to the blockchain 100. In some aspects, one or more of nodes 200 may also be validator nodes 302. In some aspects, nodes 200 that are not validator nodes 302 may perform processing such as, for example, receiving transaction submissions, providing member services, handling application programming interface (API) requests from users, or other similar functions. In this manner, the processing power of the validator nodes 302 may be preserved for generating new blocks, reaching consensus, and monitoring the other validator nodes 302. Validator nodes 302 may communicate with one another via communication pathways 304, e.g., wired or wireless connections, over the internet, etc., to transmit and receive data. For example, as new data blocks 102 are generated by validator nodes 302, validator nodes 302 may communicate or share the new data blocks 102 and transmit and receive consensus messages via communication pathways 304.

In some cases, the security and integrity of a blockchain may depend on the pace at which new blocks are added to the blockchain. The regular addition of new blocks to the blockchain inhibits the ability of a malicious actor such as a malicious validator node to perform the calculations necessary to modify already complete portions of the blockchain. For example, each time a new block is added to the blockchain, the malicious validator node will need to start the calculations from scratch. In addition, each additional block will add complexity to the calculations required for the malicious validator to attempt to modify existing blocks on the blockchain.

In some aspects, the pace may, for example, be based on the volume of transactions submitted for addition to the blockchain, the number of validator nodes actively associated with the blockchain, the complexity of the calculation required by each validator node to generate a block (for example, as set by the blockchain), or other similar factors. For example, so long as the blockchain has a good supply of new transaction, e.g., has more pending transactions available in a transaction pool for addition to the blockchain at any given time than a new block requires, and a sufficient number of validator nodes actively generating new blocks, the blockchain may be considered secure from malicious interventions.

In an aspect, however, a blockchain may not have a large volume of activity or enough validator nodes to generate new blocks at a secure rate. For example, the volume of transactions submitted for addition to the blockchain may not be sufficient to continuously support the addition of new blocks. This may slow down the rate because the validator nodes may be forced to wait until a sufficient number of transactions have been submitted before generating a new block for addition to the blockchain. In another example, the blockchain may simply receive new transactions in bursts with a period of down time in between each burst. This may cause the blockchain to add a number of blocks rapidly followed by a period in which no new blocks or a very small number of blocks are added to the blockchain. In either case the blockchain may be considered quiescent when the rate of blocks being added to the chain falls below a pre-determined threshold for a certain period of time.

For example, if the addition of a new block takes 10 minutes and there must be 6 additional blocks added to the blockchain after a block for the block to be trusted, that means that a new block should be added approximately every 10 minutes to ensure that there is no additional time to recalculate all 6 blocks and maliciously provide an alternate chain addition that changes the blockchain. Thus a pace of adding additional blocks that is, for example, 2 to 3 times slower than the 10 minutes, e.g., a new block every 30 minutes may be considered a pace that allows for potential loss of security and integrity. The longer it takes for an additional block to be added, the higher the potential loss of security and integrity of the blockchain. In some aspects, for example, the potential loss of security and integrity may be directly proportional to the amount of time greater than the time that it takes to add a new block. In some aspects, for example, the potential loss of security and integrity may be exponential to the amount of time greater than the time it takes to add a new block. For example, the pre-determined threshold may be an amount of time that is greater than the time that is takes to add a new block, e.g., 11 minutes, 12 minutes, 15 minutes, 20 minutes, etc., but small enough that the potential loss of security and integrity may be mitigated, e.g., less than 30 minutes.

In some aspects, the lack of activity on the blockchain may expose the blockchain to potential security and integrity risks. For example, when there is little or no activity on the blockchain, a malicious validator node may attempt to modify the blockchain by generating an arbitrary number of new blocks for the blockchain that in effect modify or overwrite the existing blocks of the blockchain. For example, the malicious validator node may intentionally create a fork in the blockchain by generating a series of new blocks that are appended not to the last appended block but instead to a block appended prior to the last appended block. Because the malicious validator node may have time to generate a number of successive blocks before the next actual block is appended, the malicious validator node can effectively rewrite or replace the last appended block or the last few appended blocks by generating a series of new blocks in a fork that is longer than the last few appended blocks. This may occur because the malicious validator node has additional time to perform the complex computations necessary to make the modification since no new blocks are being added to the blockchain.

Figure 4:
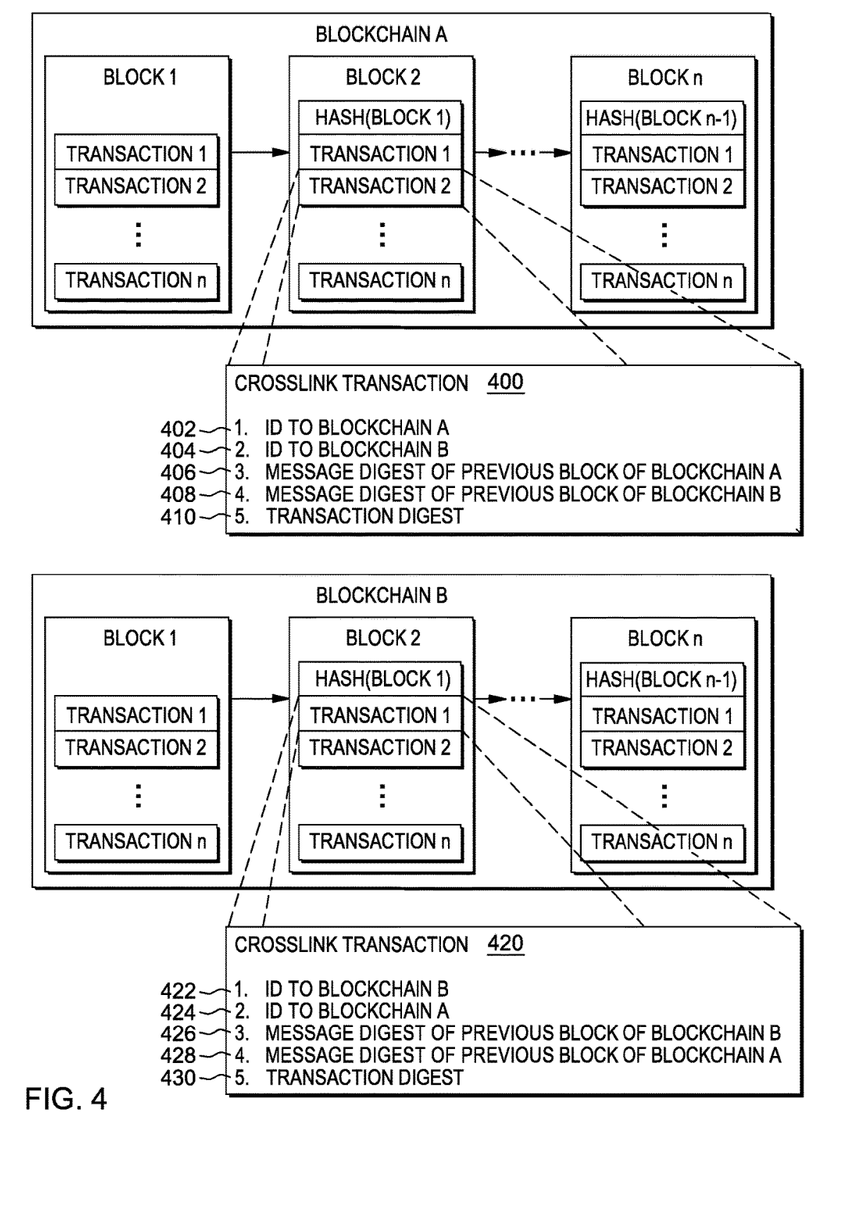
FIG. 4 is a diagram illustrating a pair of blockchains having corresponding crosslink transactions in accordance with an aspect of the present disclosure.

With reference now to FIG. 4, in some aspects, to prevent or mitigate the potential security and integrity risk to a blockchain due to quiescence, a crosslink transaction may be appended to two or more blockchains to link the verification of the security and integrity of the blockchains together. The crosslink transactions may be added to the blockchains at any time by any user of the blockchains regardless of whether the blockchain is or will become quiescent.

With continued reference to FIG. 4, a pair of blockchains, e.g., blockchain A and blockchain B, are presented. In some aspects, blockchains A and B may be separate blockchains each having their own pool of transactions. In some aspects, a user wishing to provide security to a blockchain that may become quiescent may submit a crosslink transaction to both the blockchain and another blockchain, e.g., submit a crosslink transaction to both blockchains A and B. The crosslink transaction is configured to link both blockchains A and B together at a specific point in time to capture the state of each blockchain. For example, with reference again to FIG. 4, a crosslink transaction 400 may be submitted for addition to blockchain A and a corresponding crosslink transaction 420 may be submitted for addition to blockchain B.

Crosslink transaction 400 may include, for example, an identifier(ID) 402 to blockchain A, an ID 404 to blockchain B, a message digest 406 of a previous block of blockchain A, a message digest 408 of a previous block of blockchain B, and a transaction digest 410 of the crosslink transaction 400. In some aspects, crosslink transaction 400 may include a timestamp of when the crosslink transaction is added to the blockchain.

In some aspects, the ID 402 to blockchain A may include, for example, a Uniform Resource Locator (URL) to blockchain A. In some aspects, the ID 404 to blockchain B may include, for example, a URL to blockchain B.

In some aspects, the message digest 406 of the previous block of blockchain A may include, for example, a hash of the block of blockchain A that was appended prior to a block containing the crosslink transaction. For example, message digest 406 may include a hash of block 1 of blockchain A in the example illustrated in FIG. 4, similar to hash 106 of blockchain 100 (FIG. 1). In some aspects, the message digest 408 of the previous block of blockchain B may include, for example, a hash of the block of blockchain B that was appended prior to a block containing the crosslink transaction. For example, message digest 408 may include a hash of block 1 of blockchain B in the example illustrated in FIG. 4, similar to hash 106 of blockchain 100 (FIG. 1).

In some aspects, transaction digest 410 may include, for example, a hash of the crosslink transaction 400 digitally signed by a private key of the user that submitted the crosslink transaction for addition to blockchain A.

Crosslink transaction 420 may include, for example, an ID 422 to blockchain B, an ID 424 to blockchain A, a message digest 426 of a previous block of blockchain B, a message digest 428 of a previous block of blockchain A, and a transaction digest 430 of the crosslink transaction 420.

In some aspects, the ID 422 to blockchain B may include, for example, a URL to blockchain B. In some aspects, the ID 424 to blockchain A may include, for example, a URL to blockchain A.

In some aspects, the message digest 426 of the previous block of blockchain B may include, for example, a hash of the block of blockchain B that was appended prior to a block containing the crosslink transaction. For example, message digest 426 may include a hash of block 1 of blockchain B in the example illustrated in FIG. 4, similar to hash 106 of blockchain 100 (FIG. 1). In some aspects, the message digest 428 of the previous block of blockchain A may include, for example, a hash of the block of blockchain A that was appended prior to a block containing the crosslink transaction. For example, message digest 428 may include a hash of block 1 of blockchain A in the example illustrated in FIG. 4, similar to hash 106 of blockchain 100 (FIG. 1).

In some aspects, transaction digest 430 may include, for example, a hash of the crosslink transaction 420 digitally signed by a private key of the user that submitted the crosslink transaction for addition to blockchain B.

Crosslink transactions 400 and 420 link blockchains A and B together by providing corresponding information that may be verified from either of blockchains A and B. For example, a user wishing to verify the security and integrity of blockchain B may simply review both blockchains A and B to determine whether both blockchains include the corresponding crosslink transactions 400 and 420 and that the information included in the corresponding crosslink transactions 400 and 420 matches (e.g., ID 402 of crosslink transaction 400 matches ID 424 of crosslink transaction 420, ID 404 of crosslink transaction 400 matches ID 422 of crosslink transaction 420, message digest 406 of crosslink transaction 400 matches message digest 428 of crosslink transaction 420, and message digest 408 of crosslink transaction 400 matches message digest 426 of crosslink transaction 420. In some aspects, the transaction digests 410 and 430 may also be verified using a public key of the user that appended the crosslink transactions to verify that the crosslink transactions 400 and 420 present on blockchains A and B were actually submitted by the same user.

A user wishing to ensure the security and integrity of one or both of blockchains A and B may submit a crosslink transaction, e.g., crosslink transactions 400 and 420, at any time. In some aspects, for example, a crosslink transaction may be submitted to both blockchain A and B in an initial or "genesis" block of each of blockchains A and B. This may set a baseline for future verification of blockchains A and B. In some aspects, the crosslink transaction may be submitted to blockchains A and B at a later time, for example, after a pre-determined number of blocks have been added to one or both of the blockchains, after a pre-determine amount of time has passed, or other similar reasons. In some aspects, the crosslink transaction may be submitted to blockchains A and B any time that the user believes the security and integrity of one of the blockchains may be at risk, for example, if the user believes that one of the blockchains will soon become quiescent. In some aspects, the crosslink transactions should be submitted a sufficient amount of time prior to any potential quiescence to ensure the security and integrity of the blockchains. In some aspects, for example, the user should submit the crosslink transaction at least one block prior to quiescence on one of the blockchains where practicable.

In some aspects, corresponding crosslink transactions may be submitted to any number of blockchains. For example, the corresponding crosslink transactions may be submitted to blockchains A, B, and additional blockchains, e.g., C, D, and E, or any other number of additional blockchains. Each additional blockchain will further enhance the security and integrity of the crosslinked blockchains since, for example, the likelihood that all of the blockchains become quiescent at the same time is reduced.

When a crosslink transaction is submitted for addition to blockchains A and B by the user, blockchains A and B need not be at the same block number (for example, as shown in FIG. 4). In some aspects, for example, blockchain A may include a larger number of blocks than blockchain B or may include a smaller number of blocks than blockchain B. In some aspects, the submitted crosslink transactions will be included in the next block appended to each blockchain.

Figure 5:
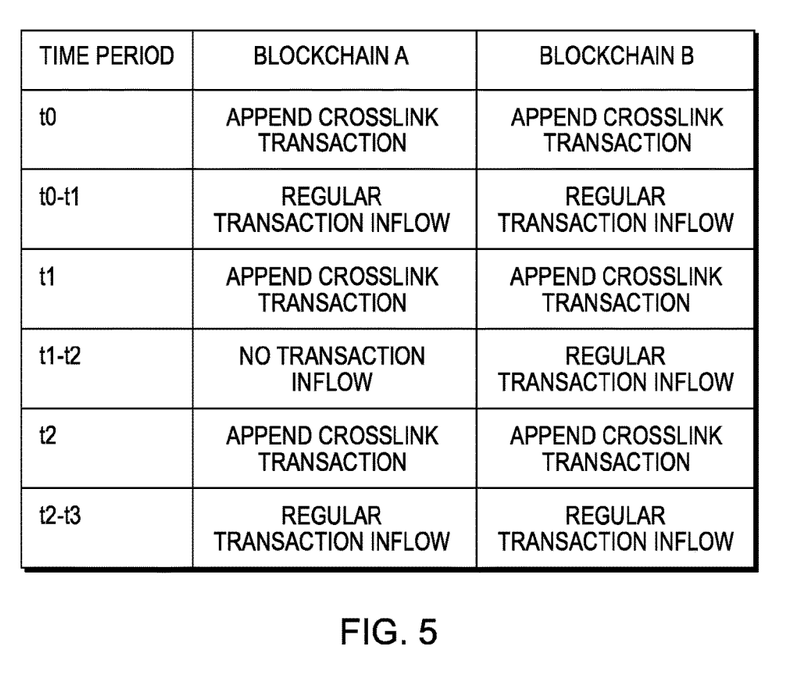
FIG. 5 is a table illustrating an example timing of crosslink transactions appended to a pair of blockchains in accordance with an embodiment of the present disclosure.

With reference now to FIG. 5, an example of the use of the crosslink transaction is illustrated. At time t0, a crosslink transaction is appended to blockchains A and B, e.g., crosslink transactions 400 and 420 (FIG. 4). From time t0 to time t1, regular transaction flow occurs on each of blockchains A and B. For example, each of blockchains A and B has a sufficient number of transactions to not be quiescent, as described above. At time t1, a new crosslink transaction is added to each of blockchain A and blockchain B, e.g., new crosslink transactions 400 and 420. From time t1 to time t2, blockchain A receives little or no transaction flow while blockchain B receives regular transaction flow. For example, blockchain A may be considered quiescent. At time t2, a new crosslink transaction is appended to blockchains A and B. From time t2 to time t3, regular transaction flow is again experience by both blockchains A and B.

In the example of FIG. 5, a user wishing to verify the security and integrity of blockchain A after the period of quiescence, e.g., after time t2 may verify the state of blockchain A by comparing the crosslink transaction appended to blockchain A at time t1 to the crosslink transaction appended to blockchain B at time t1. If the corresponding crosslink transactions match, e.g., the message digests 406 and 428 match and the transaction digests 410 and 430 may be used to verify that both of the crosslink transactions were submitted by the same entity, the user knows that all blocks from time t1 or earlier are verified. For example, in some aspects, a user that is accessing or querying the blockchain about a block that is not deep enough into the blockchain to ensure it is valid, e.g., less than 6 blocks in, may check if a later cross-link transaction exists, e.g., by comparing crosslink transactions of both blockchains A and B. If the later cross-link transaction exists, the accessed block may be validated as secure and trusted. In another example, if the user wishes to access a block on a blockchain that has not had any activity in a long time, e.g., greater than 30 minutes in the example provide above, the user may also check to see if a crosslink transaction exists after the block to verify the block.

In some aspects, for example, where a malicious validator node has overwritten or replaced blocks on a quiescent blockchain, e.g., blockchain A, the crosslink transaction may have been replaced or overwritten on blockchain A. A user of blockchain A may know that blockchains A and B are crosslinked by corresponding crosslink transactions. For example, the user of blockchain A may see prior crosslink transactions in blockchain A, e.g., an initial crosslink transaction that was included in the genesis block of blockchain A. In some aspects, the user may know that blockchains A and B are crosslinked via a third party source associated with blockchains A and B, e.g., an operator of validator nodes that validate both blockchains A and B.

In some aspects, for example, before submitting a new transaction to blockchain A, the user may query blockchain B for the latest crosslink transaction, e.g., a crosslink transaction added to blockchain B at time t2. The user may then query blockchain A to determine whether the corresponding crosslink transaction is present on blockchain A, e.g., a crosslink transaction on blockchain A having message digests and blockchain identifiers that match the message digests and blockchain identifiers found in the latest crosslink transaction on blockchain B. As mentioned above, when a malicious validator node replaces or overwrites blocks, the crosslink transaction may also be overwritten, e.g., via a fork. The absence of a corresponding crosslink transaction, e.g., a crosslink transaction having matching message digests and blockchain identifiers, in one of the blockchains may be an indication to a user of the blockchain that malicious activity is present on the blockchain. For example, if a malicious validator node modifies or overwrites the crosslink transaction appended to blockchain A at time t2, the user querying blockchains A and B will easily be able to confirm an absence of the expected crosslink transaction in blockchain A based on the presence of a corresponding crosslink transaction appended to blockchain B. In some aspects, for example, where the crosslink transaction is modified but not replaced, the user may verify the authenticity of the corresponding crosslink transactions on each of blockchains A and B using a public key of the user that submitted the crosslink transactions to decode the transaction digests 410, 430 for each crosslink transaction. If, for example, the same public key, e.g., the public key of the user who submitted crosslink transactions 400 and 420, does not correspond to the private keys used to digitally sign both transaction digests 410, 430, the user may determine that one of the crosslink transactions is not authentic and therefore that malicious activity may be present on one of the blockchains A and B.

Figure 6:
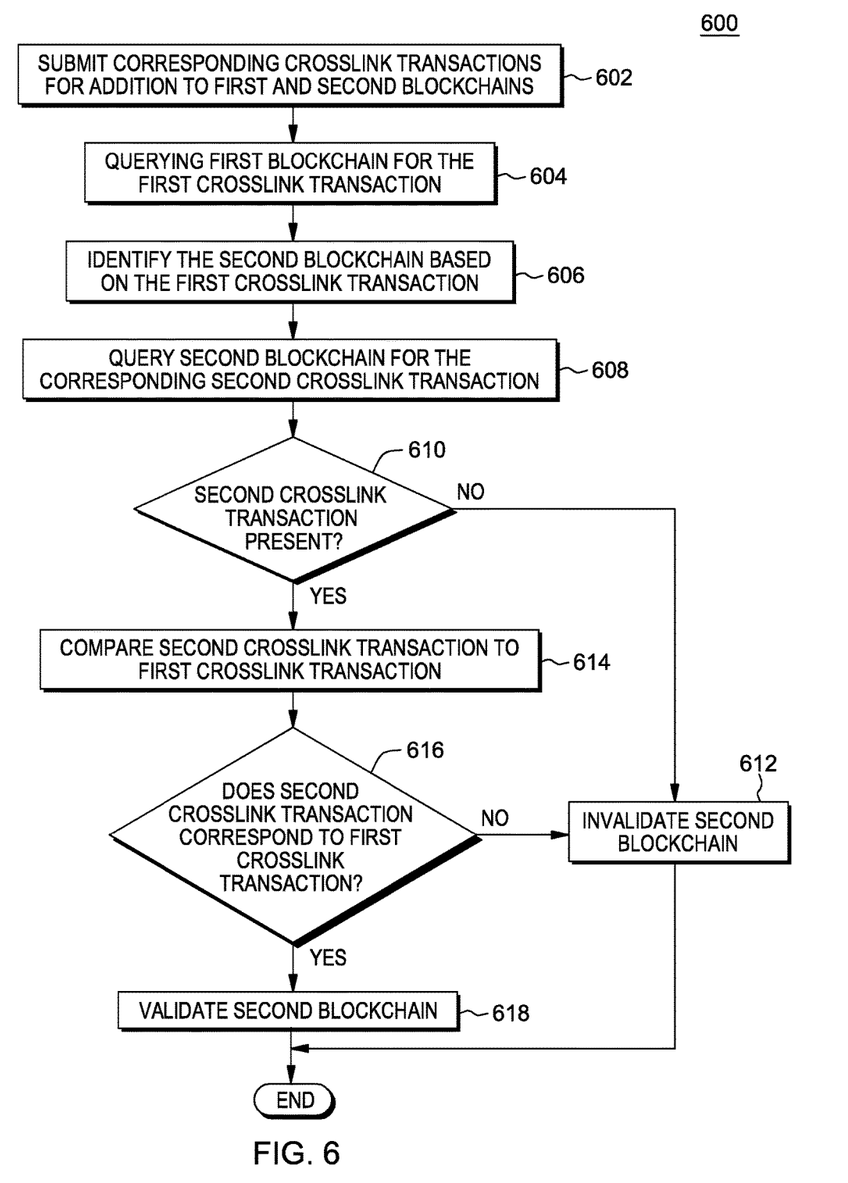
FIG. 6 is a flow chart of a method for preventing vulnerabilities in a blockchain due to a period of quiescence in accordance with an aspect of the present disclosure.

With reference now to FIG. 6, a method 600 for preventing vulnerabilities in a blockchain due to a period of quiescence is provided.

At 602, a first crosslink transaction is submitted for addition to a first blockchain and a second corresponding crosslink transaction is submitted for addition to a second blockchain, e.g., by a computing device associated with a party or user of the first and second blockchains. For example, the first crosslink transaction may be submitted to nodes 200 (FIG. 2) or validator nodes 300 (FIG. 3) associated with blockchain A (FIG. 4) for addition to blockchain A and the second crosslink transaction may be submitted to nodes 200 (FIG. 2) or validator nodes 300 (FIG. 3) associated with blockchain B (FIG. 4) for addition to blockchain B. In some aspects, for example, the user may submit the corresponding crosslink transactions when the user anticipates that one of blockchains A and B may become quiescent in the future. In some aspects, for example, the corresponding crosslink transactions may be submitted at the same time. In some aspects, for example, the first and second crosslink transactions may be submitted to the first and second blockchains at about the same time, e.g., within a few seconds, minutes, or hours of each other.

In some aspects, one of the crosslink transactions may first be submitted to the blockchain that has a higher rate of block additions followed by the submission of the other crosslink transaction to the blockchain that has a lower rate of block additions. For example, the busiest blockchain may receive the submission of the crosslink transaction first followed by the less busy blockchain. In some aspects, for example, once the crosslink transaction has been confirmed as present in a new block on the busiest blockchain, the corresponding crosslink transaction may be submitted to the less busy blockchain. In some aspects, for example, this may be reversed where the crosslink transaction may be submitted to the less busy blockchain first followed by the busiest blockchain second.

At 604, a computing device of a user, e.g., the same user or another user of one or both of blockchains A and B, may query the first blockchain, e.g., blockchain A for the first crosslink transaction. This user may query blockchain A, for example, in response to blockchain B entering a period of quiescence. For example, the user may initially determine that blockchain B has entered a period of quiescence and may know or identify that blockchains A and B have been crosslinked through crosslink transactions. For example, the user may determine that blockchains A and B have been crosslinked by querying blockchain B to see if there were any past crosslink transactions and identifying blockchain A as a blockchain having had a corresponding crosslink transaction to one found in blockchain B.

At 606, the computing device of the user may identify the second blockchain, e.g., blockchain B, based on the queried first crosslink transaction, for example, by viewing the ID 404 to blockchain B (FIG. 4).

At 608, the computing device of the user may query the second blockchain for the corresponding second crosslink transaction based on the identification of the second blockchain based on the first crosslink transaction.

At 610, the computing device of the user may determine based on a result of the query whether the corresponding second crosslink transaction is or is not present. If the second crosslink transaction is not present in the second blockchain, at least a portion of the second blockchain may be invalidated at 612. For example, the lack of the second crosslink transaction may be an indication that at least part of the second blockchain has been modified or tampered with. In some aspects, the user may utilize prior corresponding crosslink transactions of the first and second blockchains to validate at least a portion of the blockchain. For example, if a crosslink transaction at time t2 (FIG. 5) is missing for blockchain B, the user may instead try to validate at least the portion of blockchain B ending at the corresponding crosslink transaction at time t1.

At 614, if the second crosslink transaction is present in the second blockchain, the second crosslink transaction may be compared to the first crosslink transaction to determine whether the second crosslink transaction corresponds to the first crosslink transaction. For example, the any of the ID's 402, 404, 422, and 424, message digests 406, 408, 426, and 428, or the transaction digests 410 and 430 may be compared to determine the validity of the crosslink transactions 400 and 420. For example, the transactions digests 410 and 430 may be accessed or decoded using a public key of the user that submitted the crosslink transactions 400 and 420. If the transaction digests 410 and 430 are decoded using the same public key, the crosslink transactions may be validated since it has been confirmed that the same user submitted both crosslink transactions.

At 616, if the second crosslink transaction is determined to correspond to the first crosslink transaction based on the comparison, the second blockchain may be validated at 618. Alternatively, if the second crosslink transaction is determined to not correspond to the first crosslink transaction, the second blockchain may be invalidated at 612. For example, if the public key does not decode one or both of the transaction digests 410 and 430, the user will know that at least one of the crosslink transactions 400 and 420 was not submitted by the same user and therefore that the second crosslink transaction is invalid as evidence of security and integrity on the second blockchain and therefore at least a portion of the second blockchain is invalidated.

Figure 7:
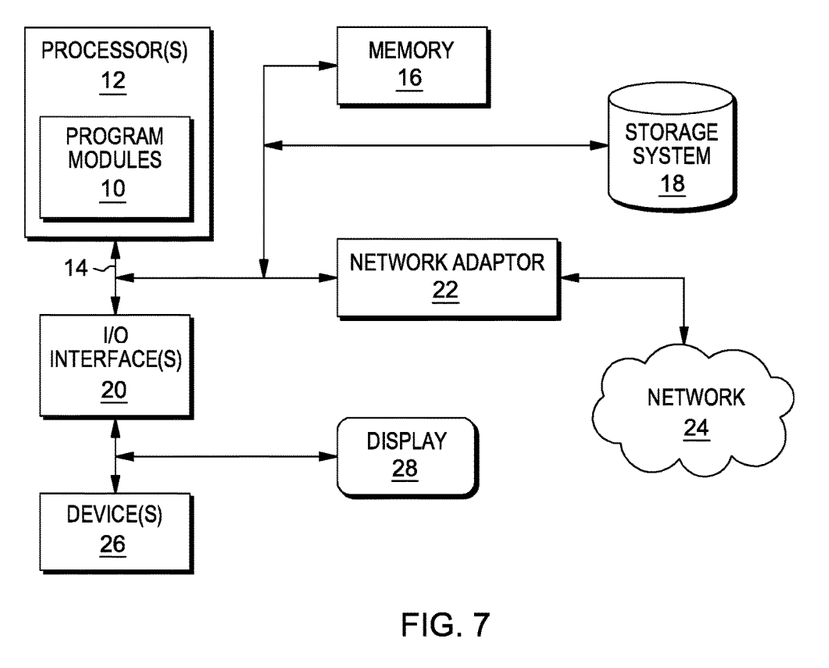
FIG. 7 is an exemplary block diagram of a computer system in which processes involved in the system, method, and computer program product described herein may be implemented.

FIG. 7 illustrates a schematic of an example computer or processing system that may implement any portion of blockchain 100, nodes 200, validators 300, blockchains A and B, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of preventing vulnerabilities in a blockchain due to a period of quiescence, the method comprising:

submitting, by a computing device associated with a party, a first crosslink transaction for addition to a first blockchain, the first crosslink transaction comprising cross-referencing information for a second crosslink transaction that corresponds to the first crosslink transaction;

submitting, by the computing device associated with the party, the second crosslink transaction for addition to a second blockchain, the second crosslink transaction comprising cross-referencing information corresponding to the first crosslink transaction, the first and second crosslink transactions linking said first blockchain and second blockchain together at a specific point in time to capture a state of each said first and second blockchain, and said first and second crosslink transactions usable together by a user of at least one of the first and second blockchains to validate at least a portion of one of the first and second blockchains after a period of quiescence in the one of the first and second blockchains based on a determination that respective cross-referencing information included in both first crosslink transaction and second crosslink transaction match.

2. The method of claim 1, wherein the first and second crosslink transactions each comprise:
an identifier to the first blockchain;
an identifier to the second blockchain;
a message digest of a last block of the first blockchain previous to a block containing the first crosslink transaction;
a message digest of a last block of the second blockchain previous to a block containing the second crosslink transaction; and
a transaction digest of the respective crosslink transaction, the transaction digest digitally signed by a private key of the party.

3. The method of claim 2, wherein the transaction digest comprises a hash of the respective crosslink transaction.

4. The method of claim 2, wherein:
the message digest of the last block of the first blockchain previous to the block containing the first crosslink transaction comprises a hash of the last block of the first blockchain previous to the block containing the first crosslink transaction; and
the message digest of the last block of the second blockchain previous to a block containing the second crosslink transaction comprises a hash of the last block of the second blockchain previous to a block containing the second crosslink transaction.

5. The method of claim 1, wherein the first and second crosslink transactions are appended to the first and second blockchains at about the same time.

6. The method of claim 1, further comprising:
querying the first blockchain for the first crosslink transaction;
identifying the second blockchain based on the first crosslink transaction;
querying the second blockchain for the corresponding second crosslink transaction based on the identification of the second blockchain based on the first crosslink transaction;
verifying that the second crosslink transaction corresponds to the first crosslink transaction; and
validating the second blockchain based on the verification that the second crosslink transaction corresponds to the first crosslink transaction.

7. The method of claim 1, further comprising:
querying the first blockchain for the first crosslink transaction;
identifying the second blockchain based on the first crosslink transaction;
querying the second blockchain for the corresponding second crosslink transaction based on the identification of the second blockchain based on the first crosslink transaction;
determining based on a result of the query that the second crosslink transaction is not present in the second blockchain; and
invalidating at least a portion of the second blockchain based on the determination that the second crosslink transaction corresponding to the first crosslink transaction is not present in the second blockchain.

8. The method of claim 1, further comprising:
querying the first blockchain for the first crosslink transaction;
identifying the second blockchain based on the first crosslink transaction;
querying the second blockchain for the corresponding second crosslink transaction based on the identification of the second blockchain based on the first crosslink transaction;
determining based on a result of the query that the second crosslink transaction is present in the second blockchain;
comparing the second crosslink transaction to the first crosslink transaction;
based on the comparison, determining that the second crosslink transaction does not correspond to the first crosslink transaction, the lack of correspondence between the first and second crosslink transactions indicating that the second crosslink transaction has been modified; and
invalidating at least a portion of the second blockchain based on the determination that the second crosslink transaction does not correspond to the first crosslink transaction.

9. The method of claim 8, wherein the comparison comprises:
applying a public key associated with the party to a transaction digest of each of the first and second crosslink transactions; and
determining that the public key associated with the party does not correspond to a private key that was used to digitally sign the transaction digest of the second crosslink transaction,
the invalidation of at least a portion of the second blockchain being in response to the determination that the public key associated with the party does not correspond to the private key that was used to digitally sign transaction digest of the second crosslink transaction.

10. A system for preventing vulnerabilities in a blockchain due to a period of quiescence comprising:
at least one hardware processor configured to:
submit a first crosslink transaction for addition to a first blockchain, the first crosslink transaction comprising cross-referencing information for a second crosslink transaction that corresponds to the first crosslink transaction;
submit the second crosslink transaction for addition to a second blockchain, the second crosslink transaction for addition to a second blockchain, the second crosslink transaction comprising cross-referencing information corresponding to the first crosslink transaction, the first and second crosslink transactions linking said first blockchain and second blockchain together at a specific point in time to capture a state of each said first and second blockchain, and said first and second crosslink transactions usable together by a user of at least one of the first and second blockchains to validate at least a portion of one of the first and second blockchains after a period of quiescence in the one of the first and second blockchains based on a determination that respective cross-referencing information included in both first crosslink transaction and second crosslink transaction match.

11. The system of claim 10, wherein the first and second crosslink transactions each comprise:
an identifier to the first blockchain;
an identifier to the second blockchain;
a message digest of a last block of the first blockchain previous to a block containing the first crosslink transaction;
a message digest of a last block of the second blockchain previous to a block containing the second crosslink transaction; and
a transaction digest of the respective crosslink transaction, the transaction digest digitally signed by a private key of the party.

12. The system of claim 11, wherein the transaction digest comprises a hash of the respective crosslink transaction.

13. The system of claim 11, wherein:
the message digest of the last block of the first blockchain previous to the block containing the first crosslink transaction comprises a hash of the last block of the first blockchain previous to the block containing the first crosslink transaction; and
the message digest of the last block of the second blockchain previous to a block containing the second crosslink transaction comprises a hash of the last block of the second blockchain previous to a block containing the second crosslink transaction.

14. The system of claim 10, wherein the first and second crosslink transactions are appended to the first and second blockchains at about the same time.

15. The system of claim 10, wherein the at least one processor is further configured to:
query the first blockchain for the first crosslink transaction;
identify the second blockchain based on the first crosslink transaction;
query the second blockchain for the corresponding second crosslink transaction based on the identification of the second blockchain based on the first crosslink transaction;
verify that the second crosslink transaction corresponds to the first crosslink transaction; and
validate the second blockchain based on the verification that the second crosslink transaction corresponds to the first crosslink transaction.

16. The system of claim 10, wherein the at least one processor is further configured to:
query the first blockchain for the first crosslink transaction;
identify the second blockchain based on the first crosslink transaction;
query the second blockchain for the corresponding second crosslink transaction based on the identification of the second blockchain based on the first crosslink transaction;
determine based on a result of the query that the second crosslink transaction is not present in the second blockchain; and
invalidate at least a portion of the second blockchain based on the determination that the second crosslink transaction corresponding to the first crosslink transaction is not present in the second blockchain.

17. The system of claim 10, wherein the at least one processor is further configured to:
query the first blockchain for the first crosslink transaction;
identify the second blockchain based on the first crosslink transaction;
query the second blockchain for the corresponding second crosslink transaction based on the identification of the second blockchain based on the first crosslink transaction;
determine based on a result of the query that the second crosslink transaction is present in the second blockchain;
compare the second crosslink transaction to the first crosslink transaction;
based on the comparison, determine that the second crosslink transaction does not correspond to the first crosslink transaction, the lack of correspondence between the first and second crosslink transactions indicating that the second crosslink transaction has been modified; and
invalidate at least a portion of the second blockchain based on the determination that the second crosslink transaction does not correspond to the first crosslink transaction.

18. The system of claim 17, wherein the comparison comprises:
applying a public key associated with the party to a transaction digest of each of the first and second crosslink transactions; and
determining that the public key associated with the party does not correspond to a private key that was used to digitally sign the transaction digest of the second crosslink transaction,
the invalidation of at least a portion of the second blockchain being in response to the determination that the public key associated with the party does not correspond to the private key that was used to digitally sign transaction digest of the second crosslink transaction.

19. A non-transitory computer readable medium comprising instructions that, when executed by at least one hardware processor, configure the at least one hardware processor to:
submit a first crosslink transaction for addition to a first blockchain, the first crosslink transaction comprising cross-referencing information for a second crosslink transaction that corresponds to the first crosslink transaction;
submit the second crosslink transaction for addition to a second blockchain, the second crosslink transaction comprising cross-referencing information corresponding to the first crosslink transaction, the first and second crosslink transactions linking said first blockchain and second blockchain together at a specific point in time to capture a state of each said first and second blockchain, and
said first and second crosslink transactions usable together by a user of at least one of the first and second blockchains to validate at least a portion of one of the first and second blockchains after a period of quiescence in the one of the first and second blockchains based on a determination that respective cross-referencing information included in both first crosslink transaction and second crosslink transaction match.

20. The non-transitory computer readable medium of claim 19, wherein the first and second crosslink transactions each comprise:
- an identifier to the first blockchain;
- an identifier to the second blockchain;
- a message digest of a last block of the first blockchain previous to a block containing the first crosslink transaction;
- a message digest of a last block of the second blockchain previous to a block containing the second crosslink transaction; and
- a transaction digest of the respective crosslink transaction, the transaction digest digitally signed by a private key of the party.

* * * * *